United States Patent
Azam et al.

(10) Patent No.: US 10,860,366 B2
(45) Date of Patent: Dec. 8, 2020

(54) MULTI ARCHITECTURE MANAGER

(71) Applicant: Hewlett-Packard Development Company, L.P., Houston, TX (US)

(72) Inventors: Syed S. Azam, Tomball, TX (US); Mike Provencher, Cypress, TX (US); Monji G. Jabori, Houston, TX (US); Valentin Popescu, Tomball, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 511 days.

(21) Appl. No.: 15/307,741

(22) PCT Filed: Apr. 30, 2014

(86) PCT No.: PCT/US2014/036266
§ 371 (c)(1),
(2) Date: Oct. 28, 2016

(87) PCT Pub. No.: WO2015/167563
PCT Pub. Date: Nov. 5, 2015

(65) Prior Publication Data
US 2017/0116029 A1    Apr. 27, 2017

(51) Int. Cl.
*G06F 9/46* (2006.01)
*G06F 9/48* (2006.01)
(Continued)

(52) U.S. Cl.
CPC ........ *G06F 9/4843* (2013.01); *G06F 3/04817* (2013.01); *G06F 3/1423* (2013.01);
(Continued)

(58) Field of Classification Search
None
See application file for complete search history.

(56) References Cited

U.S. PATENT DOCUMENTS 5,031,116 A * 7/1991 Shukunami ........ H04N 1/33315
358/1.2
6,567,984 B1   5/2003 Allport
(Continued)

FOREIGN PATENT DOCUMENTS

CN    103577135 A    2/2014
CN    104246683      12/2014
(Continued)

OTHER PUBLICATIONS

Purcher, "Will Apple Design a Hybrid ARM-x86 CPU for Future Devices?," Oct. 25, 2013, pp. 1-3, Patently Apple, Available at: <patentlyapple.com/patently-apple/2013/10/will-apple-design-a-hybrid-arm-x86-cpu-for-future-devices.html>.
(Continued)

*Primary Examiner* — Hiren P Patel
(74) *Attorney, Agent, or Firm* — Michael A. Dryja (57) ABSTRACT

An example method of managing multi-architecture system input in accordance with aspects of the present disclosure includes receiving an input from a first processing unit in the multi-architecture system, receiving an input from a second processing unit in the multi-architecture system, combining the inputs, and providing the combined inputs to a display unit. The display unit displays the combined inputs in a configurable orientation.

12 Claims, 3 Drawing Sheets

(51) Int. Cl.
   *G06F 3/14* (2006.01)
   *G09G 5/14* (2006.01)
   *G06F 3/0481* (2013.01)

(52) U.S. Cl.
   CPC .......... *G09G 5/14* (2013.01); *G09G 2340/12* (2013.01); *G09G 2352/00* (2013.01); *G09G 2360/06* (2013.01); *G09G 2360/08* (2013.01); *G09G 2370/022* (2013.01); *G09G 2370/20* (2013.01)

(56) References Cited

U.S. PATENT DOCUMENTS

| | | | | |
|---|---|---|---|---|
| 7,030,934 | B2* | 4/2006 | Shy | H04N 5/04 348/555 |
| 7,364,313 | B2* | 4/2008 | De Meerleer | G06F 3/1446 353/121 |
| 7,392,541 | B2* | 6/2008 | Largman | G06F 21/53 726/17 |
| 7,996,785 | B2* | 8/2011 | Neil | G06F 9/455 715/778 |
| 8,117,554 | B1* | 2/2012 | Grechishkin | G06F 9/45558 715/764 |
| 8,122,496 | B2* | 2/2012 | Achari | G06F 21/84 726/17 |
| 8,271,048 | B2* | 9/2012 | Shan | G06F 1/3265 455/566 |
| 8,400,568 | B2* | 3/2013 | Karaoguz | H04N 21/440263 348/563 |
| 8,446,484 | B2 | 5/2013 | Muukki et al. | |
| 8,732,607 | B1* | 5/2014 | Grechishkin | G06F 9/45558 715/781 |
| 9,317,195 | B1* | 4/2016 | Grechishkin | G06F 3/0482 |
| 9,348,633 | B2* | 5/2016 | Galicia | G06F 9/45537 |
| 9,354,900 | B2* | 5/2016 | Abraham | G06F 9/451 |
| 9,588,657 | B1* | 3/2017 | Grechishkin | G06F 9/45558 |
| 2003/0135771 | A1* | 7/2003 | Cupps | G06F 1/1626 713/320 |
| 2006/0277587 | A1 | 12/2006 | Lee | |
| 2008/0158419 | A1* | 7/2008 | Matsuda | H04N 5/445 348/468 |
| 2008/0316357 | A1* | 12/2008 | Achari | G06F 21/84 348/564 |
| 2010/0137035 | A1* | 6/2010 | Shan | G06F 1/3293 455/566 |
| 2011/0035516 | A1 | 2/2011 | Liu et al. | |
| 2011/0072349 | A1* | 3/2011 | Catanese | H04N 5/445 715/719 |
| 2011/0199389 | A1* | 8/2011 | Lu | G06F 3/017 345/619 |
| 2012/0011445 | A1* | 1/2012 | Gilboa | G06F 3/0481 715/740 |
| 2012/0038827 | A1* | 2/2012 | Davis | H04N 5/45 348/588 |
| 2012/0054508 | A1* | 3/2012 | Chen | H04L 12/00 713/300 |
| 2012/0081380 | A1* | 4/2012 | Reeves | H04L 67/1095 345/541 |
| 2012/0185799 | A1* | 7/2012 | Tsai | G06F 9/45558 715/804 |
| 2012/0192100 | A1* | 7/2012 | Wang | G06F 3/04883 715/781 |
| 2012/0317571 | A1* | 12/2012 | Chang | G06F 1/3293 718/1 |
| 2013/0021376 | A1* | 1/2013 | Satpathy | G09G 5/14 345/649 |
| 2013/0021438 | A1* | 1/2013 | Tucker | H04N 13/302 348/43 |
| 2013/0024590 | A1* | 1/2013 | Zhao | G06F 1/1616 710/300 |
| 2013/0060896 | A1 | 3/2013 | Ke | |
| 2013/0127905 | A1* | 5/2013 | Zhang | G09G 5/12 345/629 |
| 2013/0179611 | A1* | 7/2013 | Rutledge | G06F 13/12 710/73 |
| 2013/0275742 | A1* | 10/2013 | Shao | G06F 9/48 713/100 |
| 2013/0282947 | A1 | 10/2013 | Li | |
| 2013/0298140 | A1* | 11/2013 | Wolfe | G06F 9/542 719/319 |
| 2014/0139470 | A1* | 5/2014 | Li | G09G 5/00 345/173 |
| 2014/0146248 | A1* | 5/2014 | Wang | G06F 1/1641 349/12 |
| 2014/0173249 | A1* | 6/2014 | Fox | H04N 21/4316 712/30 |
| 2014/0289433 | A1* | 9/2014 | Soffer | G06F 3/023 710/74 |
| 2014/0351215 | A1* | 11/2014 | Xu | G06F 8/61 707/634 |
| 2015/0138173 | A1* | 5/2015 | Bae | G09G 3/3685 345/205 |
| 2015/0194084 | A1* | 7/2015 | Lee | G06F 3/14 345/2.3 |
| 2016/0328241 | A1* | 11/2016 | Song | G06F 9/4403 |

FOREIGN PATENT DOCUMENTS

| | | |
|---|---|---|
| TW | 200739389 A | 10/2007 |
| WO | WO-2013022138 | 2/2013 |

OTHER PUBLICATIONS

Kahn, "Report: Intel to Introduce Dual OS, Android/Windows Hybrid Machines at CES," Jan. 3, 2014, pp. 1-2, 9TO5Google: Beyond Good & Evil, Available at: <9to5google.com/2014/01/03/report-intel-to-introduce-dual-os-androidwindows-hybrid-machines-at-ces/>.

Brown, "Asus Duet Hybrid Swaps Between Android and Windows with the Push of a Button," Jan. 6, 2014, pp. 1-2, PC World, IDG Consumer & SMB, Available at: <pcworld.com/article/2084180/asus-demos-android/asus-duet-hybrid-swaps-between-android-and-windows-with-the-push-of-a-button.htm>.

* cited by examiner

MULTI ARCHITECTURE MANAGER

CROSS-REFERENCE TO RELATED APPLICATION

This application is a U.S. National Stage Application of and claims priority to International Patent Application No. PCT/US2014/036266, filed on Apr. 30, 2014, and entitled "MULTI ARCHITECTURE MANAGER," which is hereby incorporated by reference in its entirety.

BACKGROUND

Commercial PCs depend on a processor such as Intel x86 architecture and an operating system such as Microsoft Windows ecosystem for productivity and customized IT solutions. However, there is an increasing need for applications that are only available on other architectures and operating systems such as the ARM architecture and a mobile operating system, such as Google Android ecosystem. A method may be utilized to provide multiple operating environments on a single system such as hypervisors, Virtual Desktop Infrastructure (VDI), and virtual container solutions.

BRIEF DESCRIPTION OF THE DRAWINGS

Example implementations are described in the following detailed description and in reference to the drawings, in which.

DETAILED DESCRIPTION

Various implementations described herein are directed to a computing system with multi-architecture configuration. More specifically, and as described in greater detail below, various aspects of the present disclosure are directed to a manner by which at least two operating environments are used on one display by modifying a common graphics overlay subsystem and human interface to create a modular hybrid system that supports at least one architecture (e.g., ARM and/or x86 architectures). Further, all operating environments may share common input/output devices.

Aspects of the present disclosure described herein implement a system that can display multiple operating environments by combining the output of multiple architectures in one device. According to various aspects of the present disclosure, the approach described herein allows a user to add a new device to an existing architecture and use one hybrid display to interact with both devices. More specifically, the hybrid display can take a video signal from both architectures, creating a modular hybrid system (e.g., combination of a plurality of architectures) that supports both operating environments (for examples, operating environments, such as but not limited to, Android running on ARM and Windows running on x86 architectures).

Moreover, aspects of the present disclosure described herein also disclose adjusting by, for example, pre-defined user preferences, inferring application context, or user interaction through user interface elements such as icons or mechanical switching using a button, between full screen operating environments, one full screen for one operating environment and the other operating environment windowed or partial screen for both operating environments side-by-side. Among other things, this approach allows the user to choose a configuration and provide such choice via a button. Accordingly, this approach advantageously provides that a single hybrid display that may have elements of a plurality of operating environments, avoiding the need for two separate displays and therefore creating a low incremental cost solution.

Further, aspects of the present disclosure described herein also disclose two architectures that are separate at hardware level. Among other things, this approach allows achieving dual-operating system support without requiring two independent touch displays. As a result, this solution provides a most cost conscious option as display units are the most costly component of devices.

In addition, virtualized environment consume resources, emulated environments have performance and application compatibility issues. For example, peripheral virtualization issues may exist. Aspects of the present disclosure described herein address these issues.

In one example in accordance with the present disclosure, a method for managing display units is provided. The method comprises receiving an input from a first processing unit in the multi-architecture system, receiving an input from a second processing unit in the multi-architecture system, combining the inputs, and providing the combined inputs to a display unit. The display unit displays the combined inputs in a configurable orientation.

In another example in accordance with the present disclosure, another system is provided. The system comprises a display unit, and a first processing unit comprising a processor, a switching unit and a scaler, the first processing unit to provide, by the processor, an input, select, by the switching unit, at least one of the input from the first processor unit and an input from a second processing unit, and transmit, by the scaler, the selected at least one input to the display unit. The display unit is coupled to the first processing unit and receives input from the first processing unit and the second processing unit.

In a further example in accordance with the present disclosure, a method for managing a projection system is provided. The non-transitory computer-readable medium comprising instructions which, when executed, cause a device to (i) select at least one of an input from the first processor unit and an input from a second processing unit, and (ii) transmit the selected at least one input to a display unit. The display unit is coupled to the first processing unit and receives input from the first processing unit and the second processing unit.

Figure 1A:
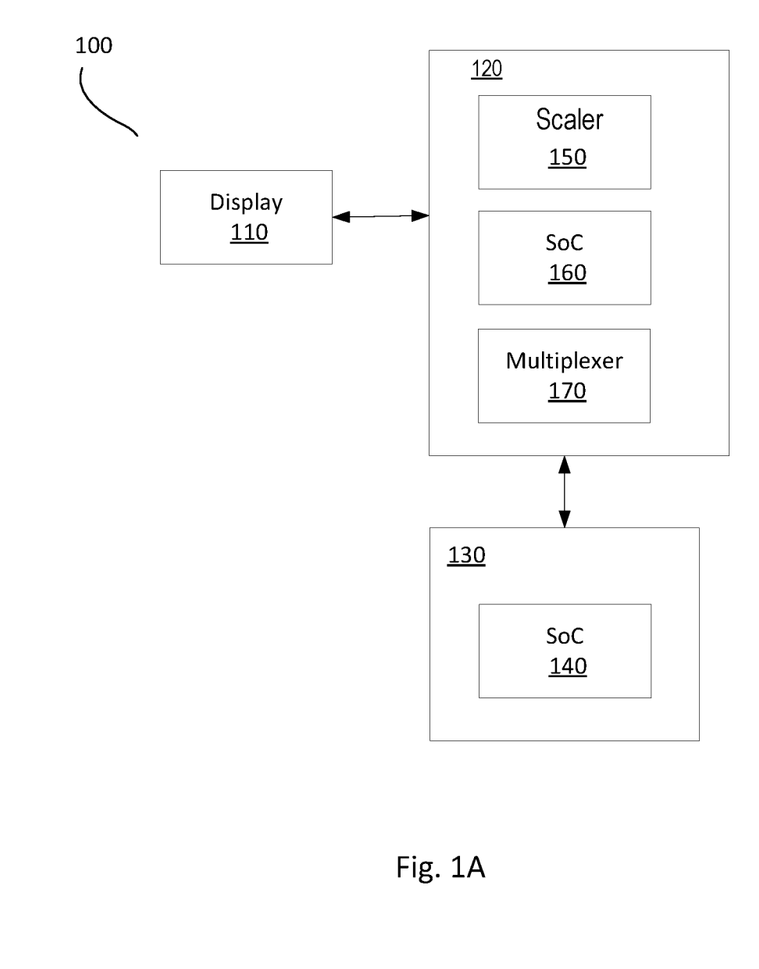
FIGS. 1A and 1B illustrate example systems in accordance with the principles disclosed herein.
Figure 1B:
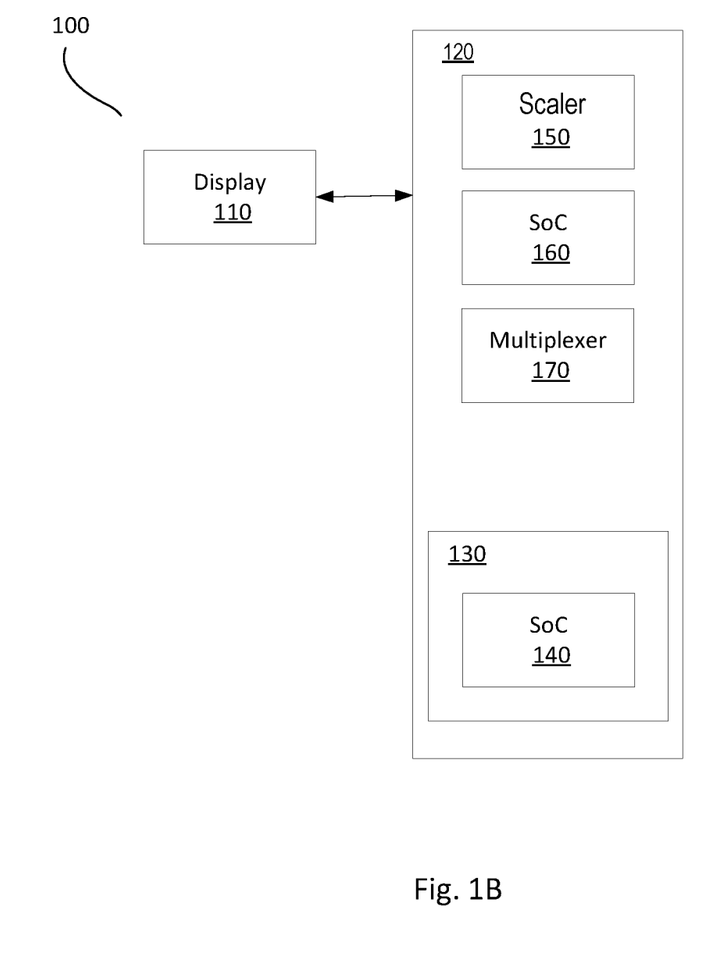

Referring now to FIGS. 1A and 1B, a system 100 in accordance with the principles disclosed herein is shown. In this example, system 100 generally comprises a display 110, a processing unit 120, and a processing unit 130. The processing unit 120 comprises a scaler 150, a system on chip (SoC) 160, and a switching unit (e.g., multiplexer) 170. The processing unit 130 comprises a SoC 140. In FIG. 1A, the processing units 120 and 130 are shown to be in different devices and may be suitable for any computing device while still complying with the principles disclosed herein. For example, in some implementations, the processing unit 120 may be an electronic display, a smartphone, a tablet, an all-in-one computer (i.e., a display that also houses the computer's board), or some combination thereof. In this example, the processing unit 120 is an all-in-one computer. Further, in this example, the operating environment 130 is a mobile device. In FIG. 1B, the processing units 120 and 130 are shown to be in the same device. More specifically, the processing unit 130 is a part of processing unit 120, considered as one unit. It should be readily apparent that the present illustration should not be interpreted to be limited by this particular illustrative architecture shown in FIGS. 1A and 1B, and the system 100 represents a generalized illustration and that other elements may be added or the illustrated elements may be removed, modified, or rearranged in many ways. For example, while the system 100 depicted in FIGS. 1A and 1B includes only two operating environments, the system may actually comprise any number of operating environments, and only two have been shown and described for simplicity. Also, it should be noted that the operating environments can be multiples instances of the same architecture or they may be from different architectures (such as, but not limited to, x86, x86_64 or ARM). Further, in some implementations, the system 100 may comprise more than one display unit. For example, the system 100 may send combined inputs from multiple operating environments to multiple displays.

In one implementation, a user may interact with the display 110. The display 110 defines a viewing surface and is to project images for viewing and interaction by a user (not shown). In some examples, the display 110 includes touch sensitive technology such as, for example, resistive, capacitive, acoustic wave, infrared (IR), strain gauge, optical, acoustic pulse recognition, or some combination thereof. Therefore, throughout the following description, the display 110 may periodically be referred to as a touch sensitive surface or display. More specifically, the control signals provided to the display 110 may be from at least one user touching the display (e.g., hand or finger of a user). The display 110 displays applications and images captured from a plurality of operating environments (which will be described in greater detail below). In one implementation, one application may have a window shown on the display 110. Moreover, the same display 110 may have additional windows shown for other operating environments. In such an implementation, the size of the windows may be adjusted across the display 110 based on a plurality of criteria, including a user's preference.

In an example implementation, two processing units (e.g., the processing units 120 and 130) use the same display (e.g., the display 110) alternatively or simultaneously. In one implementation, a window for one of the processing units may be displayed on the display unit 110. For example, the processing unit 120 may have a window on the display 110. Such window may comprise icons for a plurality of applications that are compatible to run on the processing unit 120. The applications may comprise information and visual assets (e.g., graphics. In some implementations, different windows may have different settings. More specifically, the specification of the display 110 may identify a resolution value, and thus, fonts for the applications being displayed on that window. In another example, a different window is displayed for another operating environment. For example, the display 110 may show a second window for the processing unit 130. This second window may show icons for applications to be run on the processing unit 130. The display 110 identifies a resolution value, and thus, fonts for the applications being displayed on that window. Accordingly, certain settings of the applications may be adjusted based on the corresponding operating environment to maintain the physical size consistency between the windows across the display units.

In one implementation, the display 110 is a hybrid display that takes video signals (such as, but not limited to, high definition multimedia interface (HDMI) input) from a plurality of architectures (e.g., the processing units 120 and 130) and outputs. The display 110 may switch between full screen operating environments, display one input full screen and another input windowed, or display two inputs side-by-side. When the inputs are shown side-by-side, environment partitioning can be of variable sizing, e.g., one environment can have a portrait orientation while the other is landscape. The system 100 is capable of supporting any HDMI input, connecting to a scaler 150 or CSI to enable dual operating environment from two architectures. An SoC (e.g., application processors) includes an mobile industry processor interface (e.g., CSI) for a camera input. This interface brings a camera input in to processes and store it (e.g., pictures and video). According to various aspects of this disclosure, this interface may be used to take in HDMI input and re-route the input, instead of storing it, to the internal LCD (e.g., the display unit 110).

In one implementation, the display 110 comprises a button to switch or adjust a configuration of input sources (e.g., video sources and/or human input devices such as touchscreen, touchpad, keyboard, and mouse and/or other connected peripheral devices) between the processing unit 120 and the processing unit 130. For example, a user may use the switch or button to communicate how he wants to configure the display. In one implementation, the user may choose to apply full screen to display from the processing unit 120 (e.g. the full screen display of Windows). In another implementation, the user may choose to apply full screen to display from the processing unit 130 (e.g., the full screen display of Android). In a further implementation, the user may choose that a portion of the display is used for the processing unit 120 and the other portion of the display is used for the processing unit 130 (e.g., half screen for Windows, half screen for Android). In some implementations, a message may be created and displayed to configure the screen orientation. For example, the user may choose to display Windows in a portrait orientation, where the user may choose to display Android in a landscape orientation. Further, the user may also decide what ratio of the screen can be used for the processing unit 120 and what ratio for the processing unit 130 (e.g., 20% of the screen for Android, 80% of the screen for Windows).

As mentioned earlier, the processing units 120 and 130 may be intended to be representative of a broad category of data processors. The processing units 120 and 130 may be any device capable of processing data, interacting with a corresponding content stream and communicating locally or over a network. The processing units 120 and 130 may be further capable of supporting various operations, such as and not limited to, content viewing, recording, downloading, uploading, content play, etc. As used herein, a "computing device" may be a desktop computer, notebook computer, workstation, tablet computer, mobile phone, smart device, server, or any other processing device or equipment. Any computing device described herein that the processing units 120 and 130 run on includes a processor. In some implementations, these computing devices include a memory. Depending on the implementation, security features/tools may be implemented in various ways such as by a firewall, one time passwords, encryption programs, digital certificates, user application security, etc. Various combinations of these and/or other security features may be used.

In one example, the first processing units 120 is, for example, a notebook computer with an x86 architecture, and the second processing units 130 is, for example, a smart phone with an advanced RISC machine (ARM) architecture. In such example, the notebook computer (i.e., the first processing units 120) may be the primary whereas the smart phone (i.e., the second processing units 130) may be the secondary. The processing units 120 and 130 comprise separate hardware components. Accordingly, sensitive information such as passwords and user data are contained within their own separate environments and may not be accessed or captured by the other processing unit. Further, the processing units 120 and 130 run simultaneously, not requiring one to be off in order for the other one to control the display 110.

According to aspects of this invention, the processing units 120 and 130 may run simultaneously. For example, an Android environment (e.g., the processing unit 120) may be running a music application, and a Windows environment (e.g., the processing units 130) may be displaying a document. The display unit 110 may be displaying the document from the processing unit 130 in a full screen mode, and the music application may be invisible as it does not require a visual display. The music may be played via a speaker attached to the system.

As shown FIGS. 1A and 1B, the switching unit 170 is coupled to the processing units 120 and 130. In one implementation, the switching unit 170 switches between the first processing units 120 and the second processing units 130 to determine whether the display unit 110 is controlled by the first processing units 120 or the second processing units 130. In another implementation, the switching unit allows both units (i.e., the first and second processing units 120 and 130) to control the display unit 110. More specifically, each processing unit may have its associated control input (e.g., keyboard and mouse), and each processing unit may control a portion of the display unit 110 via the associated control input.

The scaler 150 resides between the display 110 and the SoC 160 (a built-in onboard source) and receives a feed from additional processing units (e.g., the processing unit 130) via the switching unit 170 (e.g., multiplexer). For example, a TV or monitor with multiple inputs is a typical application of the scaler 150. The scaler 150 has limited built-in nonvolatile memory where settings can be stored.

The input from the switching unit 170 into the scaler 150 and the output from SoC 160 into the switching unit 170 may be USB, which includes an ability to handle video, audio, power, etc. The scaler 150 drives the display 110 by applying multiple source inputs and output to a single display. The features of the scaler 150 include picture in picture and graphics overlay which are utilized to show content from multiple sources. More specifically, the scaler 150 takes a video input signal from a first video source and converts it to fit a screen. In another implementation, the system 100 may adapt a camera serial interface (CSI). CSI protocol is a specification that governs the video input signal to the SoC 160. The CSI is scalable in speed and bandwidth. If the video input signal is being fed by a higher density camera or any image stream (e.g., HDMI) needs more bandwidth, the CSI may handle by assigning more lanes to the channel. The CSI receives the input signal in the SoC 160 in the processing unit 120 and converts it to fit the screen of the display 110. Further, the SoC 160 comprises an internal Image Signal Processor (ISP), which processes the input stream and passes it to the display 110 or any other output. The ISP may be tied to the internal fabric of the SoC and can pass high amounts of data to the display block of the SoC to control the internal display of the processing unit 120 (e.g., tablet or other mobile device).

In one implementation, the switching unit 170 takes the input signal from a SoC 140 (comprising a processor) in the processing unit 130 and converts it to fit the screen of the display 110. In another implementation, the scaler 150 takes the input signals from both sources and fits both on the display 110. The switching unit 170 sits between the scaler 150 and the SoC 160 and acts as a multiple-input, single-output switch. More specifically, the switching unit 170 may be a toggle switch in between the scaler 150 and the SoC 160 and determines the active source which controls the display 110.

The SoC 160 is an integrated circuit (IC) that integrates all components of a computer or other electronic system into a single chip. More specifically, the SoC 160 comprises a processor (e.g., x86), a memory (e.g., ROM, RAM, EEPROM and flash memory). Moreover, the SoC 160 may comprise timing sources including oscillators and phase-locked loops; peripherals including counter-timers, real-time timers, and power-on reset generators; external interfaces including industry standards such as USB, FireWire, Ethernet, UART, SPI; voltage regulators and power management circuits.

As shown FIGS. 1A and 1B, the processing unit 130 comprises the SoC 140 (e.g. ARM). Both the processor in the SoC 160 and the SoC 140 in the processing unit 130 may be at least one central processing unit (CPU), at least one semiconductor-based microprocessor, other hardware devices or processing elements suitable to retrieve and execute instructions stored in a machine-readable storage medium, or combinations thereof. The processors can include single or multiple cores on a chip, multiple cores across multiple chips, multiple cores across multiple devices, or combinations thereof. The processors may fetch, decode, and execute instructions to implement various processing steps. More specifically, the instructions, when executed by processor (e.g., via one processing element or multiple processing elements of the processor) can cause processor to perform processes, for example, the processes depicted in FIGS. 1A and 1B.

The processors may process machine-readable instructions, such as processor-readable (e.g., computer-readable) instructions. For example, the machine-readable instructions may configure the SoC 140 to allow the processing unit 130 to perform the methods and functions disclosed herein. Similarly, the machine-readable instructions may configure processor in the SoC 160 to allow the processing unit 120 to perform the methods and functions disclosed herein. The machine-readable instructions may be stored in a memory, such as a non-transitory computer-usable medium, coupled to the processors and may be in the form of software, firmware, hardware, or a combination thereof. In a hardware solution, the machine-readable instructions may be hard coded as part of processors, e.g., an application-specific integrated circuit (ASIC) chip. In a software or firmware solution, the instructions may be stored for retrieval by the processors. Some additional examples of non-transitory computer-usable media may include static or dynamic random access memory (SRAM or DRAM), read-only memory (ROM), electrically erasable programmable ROM (EEPROM) memory, such as flash memory, magnetic media and optical media, whether permanent or removable, etc.

In one implementation, the processing device 120 (e.g., an x86-based tablet system) and the processing device 130

(e.g., an ARM-based Android system) may be housed in a platform. Such platform may be a jacket, accessory or docking station that interfaces to via its HDMI port. In one implementation, the platform is identified by a tablet (e.g., the processing unit 120) as an HDMI input accessory, which triggers the embedded controller 180 to switch the video stream from an HDMI output to an HDMI input. The switching unit 170 allows selection between the output of the SoC 160 (HDMI1) and the output of the processing unit 130 in the jacket (HDMI2). The HDMI stream is then passed to the scaler 150 (or CSI in another implementation), which sends the stream to the display 110.

Figure 2A:
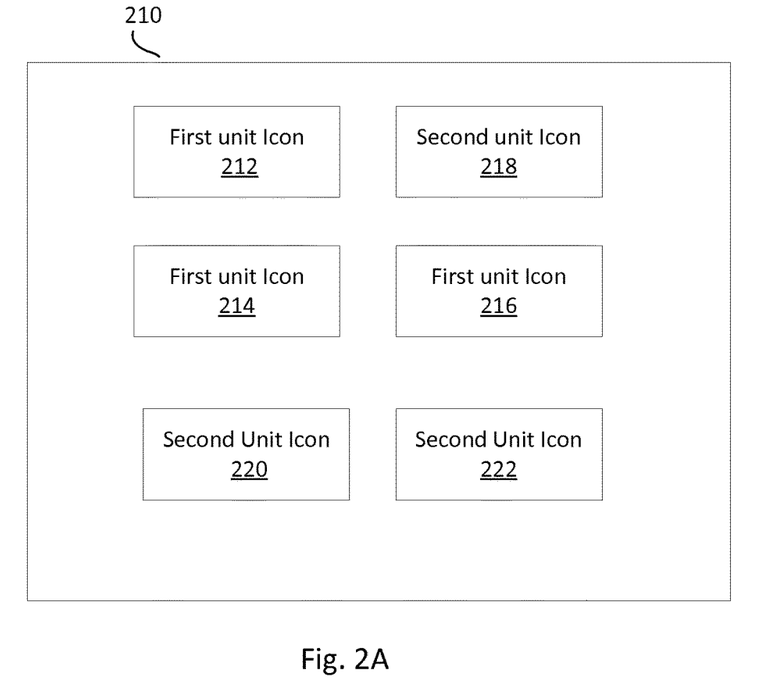
FIGS. 2A and 2B illustrate example user interfaces of the system in FIGS. 1A and 1B in accordance with an implementation in accordance with the principles disclosed herein.
Figure 2B:
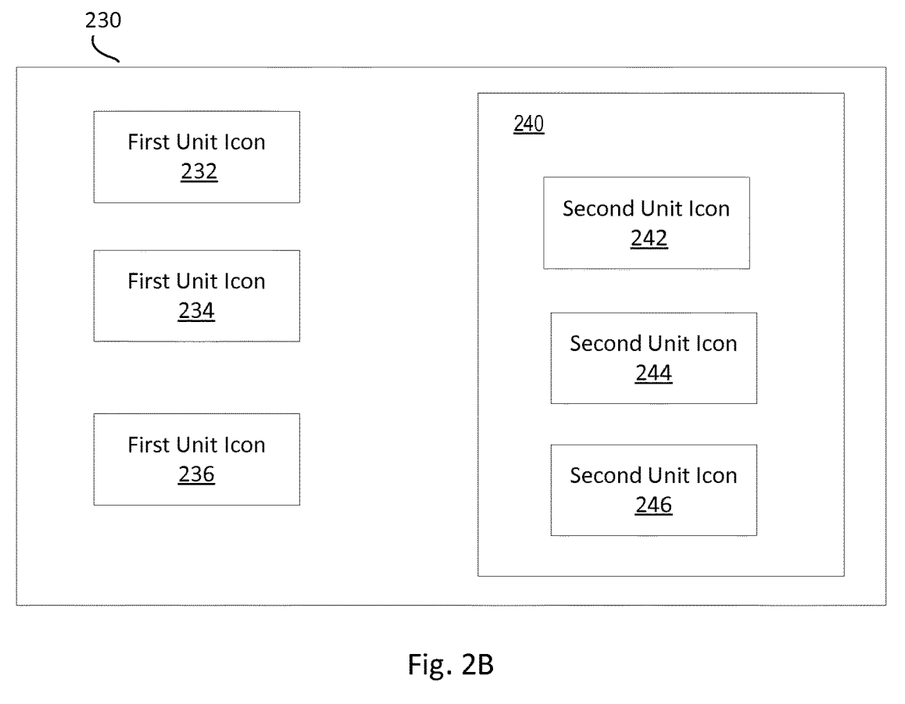

FIGS. 2A and 2B illustrate interfaces 210 and 230 of the display 110 as described in FIGS. 1A and 1B in accordance with an example implementation. It should be readily apparent that the user interfaces illustrated in FIGS. 2A and 2B represent generalized depictions and that other components may be added or existing components may be removed, modified, or rearranged in many ways. The user interfaces 210 and 230 described herein may comprise a number of user interface components, each with a particular role, as shown in FIGS. 2A and 2B. These modules can be either functions within the computer program product described herein, sub-methods of the method described herein, and/or elements of the system described herein, for instance.

As described in FIGS. 1A and 1B, the display 110 may show a user interface (UI) that the processing unit 120 may output on the display 110. The user interface may facilitate interactions between a user of the processing unit 120 and 130 and the processing units. One user interface shown on the display 110 displays applications that can run on the processing unit 120 and applications that can run on the processing unit 130. In one example system, such user interface may present various icons for various applications that represent functionalities available to the user 110. FIG. 2A illustrates the user interface 210 on the display 110 shown in FIGS. 1A and 1B in accordance with an example implementation. The interface 210 represents a communication channel for the processing unit 120. In one implementation, the processing unit 120 may run a Windows operating system, and thus, the interface 210 may be a Windows desktop. Moreover, the processing unit 130 may run a mobile operating system (e.g., Android). The user interface 210 comprises first unit icons 212, 214, 215 and second unit icons 218, 220 and 222. In one example, the icons 212, 214, 215 represent applications that are compatible to run on the processing unit 120. Moreover, the icons 218, 220 and 222 represent applications that are compatible to run on the processing unit 120. Accordingly, referring back to the implementation mentioned above, where the processing unit 120 runs a Windows operating system, and thus, the interface 210 is a Windows desktop, the application icons for both of the processing units 120 and 130 are illustrated as shortcuts on the Windows desktop. It should be noted that while the user interface 210 depicted in FIG. 2A includes three first unit icons and three second unit icons, the interface 210 may actually comprise more or fewer icons, and three icons for each processing unit have been shown and described for simplicity.

In one implementation, the user may interact with the interface 210 to select one of the icons to initiate the application on one of the processing units. For example, the user may select icon 212 to run the application that the icon 212 represents on the processing unit 120. In another example, the user may choose the icon 218 to run the application associated with the icon 218 on the processing unit 130. In such implementation, notifications from one processing unit may also be overlaid into the display area of the other processing unit, for example to indicate receipt of new mail. More specifically, referring to the example discussed above, where the processing unit 130 runs a mobile operating system, the processing unit 120 runs a Windows operating system, and the interface 210 is a Windows desktop, notification from the mobile operating environment along with notifications from the Windows operating environment may be shown on the Windows desktop.

It should be noted that when one of the processing units is in full screen display mode (e.g., claims the full screen), the applications for the other processing unit are displayed as icons on the display (e.g., user interface). For example, if the Window operating environment claims the full screen of the display unit 110, the applications of the Android operating environment are displayed as icons on the Windows desktop.

FIG. 2B illustrates the user interface 230 on the display 110 shown in FIGS. 1A and 1B in accordance with an example implementation. The user interface 230 represents a communication channel for the processing unit 130. In one example, the processing unit 130 runs an Android operating system, and the user interface 230 is an Android home screen of the mobile device. Moreover, the user interface 230 comprises first unit icons 232, 234, 236. Such icons represent applications that can be run by the processing unit 130. For example, the icons may represent mobile applications (e.g., Skype, App Store) that are compatible with the mobile operating system running on the processing unit 130.

Further, the user interface 230 comprises a window 240. In one implementation, the window 240 represents a user interface associated with the processing unit 120. The window 240 comprises second unit icons 242, 244 and 246. In one example, the icons 242, 244 and 246 represent applications that are compatible to run on the processing unit 120. For example, the processing unit 120 runs an operating system for a personal computer (e.g., Windows). The icons 242, 244 and 246 represent applications (e.g., Microsoft word, adobe acrobat reader) that run on the personal computer operating system.

It should be noted that while the user interface 230 depicted in FIG. 2B includes three first unit icons and three second unit icons, the interface 230 may actually comprise more or fewer icons, and three icons for each processing unit have been shown and described for simplicity.

Figure 3:
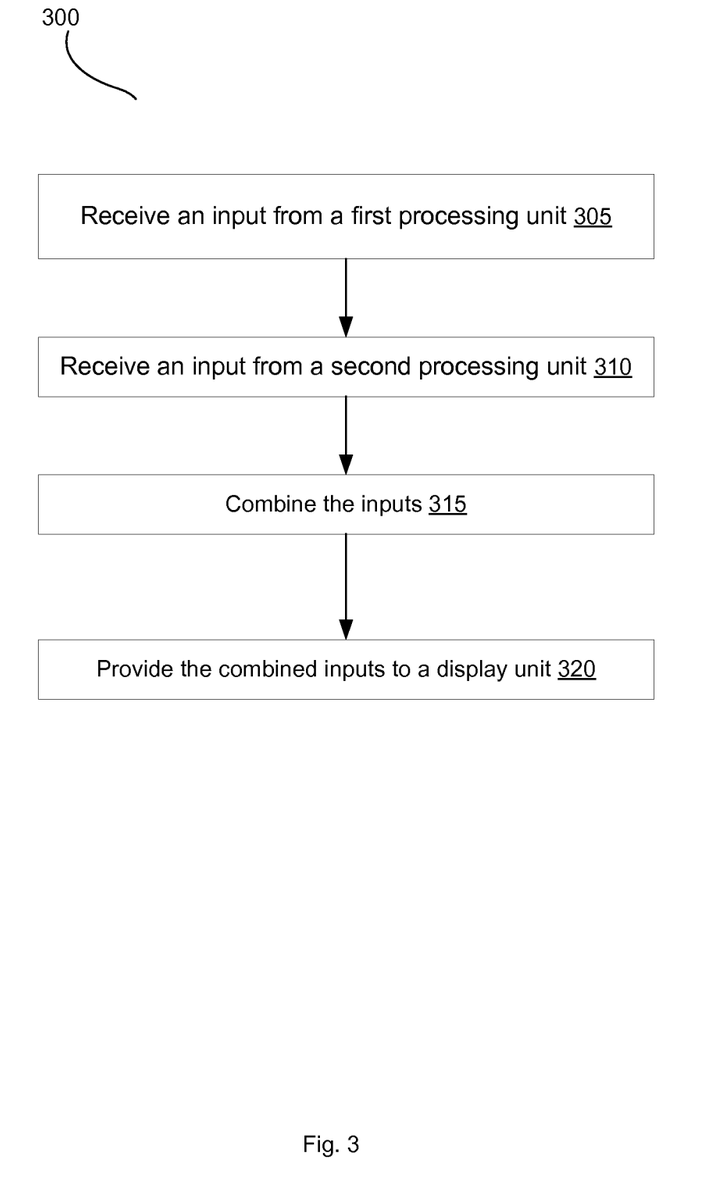
FIG. 3 illustrates an example process flow diagram in accordance with the principles disclosed herein.

Turning now to the operation of the system 100, FIG. 3 illustrates an example process flow diagram 300 in accordance with an implementation. It should be readily apparent that the processes depicted in FIG. 3 represent generalized illustrations, and that other processes may be added or the illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the processing units 120 and 130.

The process 300 depicts an example of method that may be used to manage a multi-architecture configuration. The machine-readable instructions may instruct the processors in the processing units 120 and 130 to allow system 100 to perform the process 300 as illustrated by the flowchart in FIG. 3. In one implementation, the system 100 may perform the process 300 in response to receiving an instruction from a user to control the system.

The process 300 may begin at block 305, where the system receives an input from a first processing unit in the multi-architecture system. At block 310, the system receives an input from a second processing unit in the multi-architecture system. At block 315, the system combines the inputs. At block 320, the system provides the combined inputs to a display unit. In one implementation, the display may show a full screen from the first processing unit. In another implementation, the display may show a full screen from the second processing unit. In a further implementation, the display may show output from both of the processing units. For example, a portion of the display may be for the first processing unit, and a second portion of the display may be for the second processing unit. More specifically, the display unit displays the combined inputs in a configurable orientation. The user may configure the display. For example, the user may choose to reserve 25% of the screen to the first processing unit and choose a portrait orientation for it. Further, the user may choose to reserve 75% of the screen to the second processing unit and choose a landscape orientation for it.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A system, comprising:
a display unit having a screen; and
a first processing unit comprising a first processor having a first architecture on which the first processor runs a first operating system having a first operating environment in which a plurality of first applications are run, a switching unit, a first system on chip (SoC), and a scaler, the first processing unit to:
provide, by the first processor, a first input to the first SoC according to a camera serial interface (CSI) protocol;
convert, by the first SoC, the first input to fit into the screen of the display unit;
receive, by the scaler, the converted first input and a second input, the second input provided by a second SoC of a second processing unit comprising a second processor having a second architecture on which the second processor runs a second operating system having a second operating environment in which a plurality of second applications are run;
combine, by the scaler, the converted first input and the second input into an orientation comprising a full screen of the first operating environment in which the first applications are run and a window of the second operating environment in which the second applications are run, wherein the window of the second operating environment is overlaid into the full screen of the first operating environment; and
transmit, by the scaler, the combined first and second inputs to the display unit for display on the screen,
wherein the first processing unit transmits a first control signal to the switching unit to select the first input,
and wherein the first processing unit transmits a second control signal to the switching unit to select the second input.

2. The system of claim 1, wherein the display unit displays the combined first and second inputs.

3. The system of claim 1, wherein the first architecture is an x86 architecture, and the second architecture is an advanced RISC machine (ARM) architecture, and wherein the first and second processing units run simultaneously.

4. The system of claim 1, wherein the orientation is a first orientation of the first and second inputs, and the display unit comprises a physical or digital button or logic to switch between the first orientation and a second orientation of the first and second inputs.

5. The system of claim 4, wherein the second orientation comprises a side-by-side display of a first operating environment of the first operating system and a second operating environment of the second operating system.

6. The system of claim 4, wherein the scaler uses a universal asynchronous receiver transmitter (UART) to communicate to the display unit and button.

7. The system of claim 1, wherein a first control signal is transmitted to select the first input, and a second control signal is transmitted to select the second input, the first and second control signals being transmitted simultaneously.

8. The system of claim 1, wherein the first and second processing units are separated at a hardware level and sharing only the display unit, human interface devices, and peripherals.

9. A method comprising:
receiving, by a first system on chip (SoC) of a first processing unit, a first input from a first processor of the first processing unit according to a camera serial interface (CSI) protocol, the first processing unit having a first architecture on which the first processor runs a first operating system having a first operating environment in which a plurality of first applications are run;
converting, by the first SoC, the first input to fit into a screen of a display unit;
receiving, by a scaler of the first processing unit, the converted first input and a second input, the second input provided by a second SoC of a second processing unit comprising a second processor having a second architecture on which the second processor runs a second operating system having a second operating environment in which a plurality of second applications are run;
combining, by the scaler, the converted first input and the second input into an orientation comprising a full screen of the first operating environment in which the first applications are run and a window of the second operating environment in which the second applications are run, wherein the window of the second operating environment is overlaid into the full screen of the first operating environment; and
providing, by the scaler, the combined first and second inputs to a display unit,
wherein the display unit displays the combined first and second inputs in a configurable orientation for display on the screen,
wherein the first processing unit transmits a first control signal to a switching unit of the first processing unit to select the first input,
and wherein the first processing unit transmits a second control signal to the switching unit to select the second input.

10. The method of claim 9, wherein the orientation is a first orientation of the first and second inputs, and the method further comprises creating a message identifying a current orientation of the first and second inputs, the current orientation switchable among the first orientation, a second orientation where the first and second inputs are displayed side-by-side, and a third orientation where the first input is displayed in full screen and the second input is windowed.

11. A non-transitory computer-readable medium comprising instructions which, when executed, cause a first processing unit to:

provide, by a first processor of the first processing unit, a first input to a first system on chip (SoC) of the first processing unit according to a camera serial interface (CSI) protocol;

convert, by the first SoC, the first input to fit into a screen of a display unit;

receive, by a scaler of the first processing unit, the converted first input a second input, the second input provided by a second processor of a second processing unit, the first processor having a first architecture on which the first processor runs a first operating system having a first operating environment in which a plurality of first applications are run, the second processor having a second architecture on which the second processor runs a second operating system having a second operating environment in which a plurality of second applications are run;

combine, by the scaler, the selected first and second inputs into an orientation comprising a full screen of the first operating environment in which the first applications are run and a window of the second operating environment in which the second applications are run, wherein the window of the second operating environment is overlaid into the full screen of the first operating environment; and transmit, by the scaler, the combined first and second inputs to the display unit for display on the screen, wherein the first processing unit transmits a first control signal to a switching unit of the first processing unit to select the first input, and wherein the first processing unit transmits a second control signal to the switching unit to select the second input.

12. The non-transitory computer-readable medium of claim 11, comprising further instructions which, when executed, cause the first processing unit to control user settings including audio, color depth, and screen resolution.

* * * * *